(No Model.)

J. G. SHEARLOCK.
HOT WATER HEATER.

No. 555,467. Patented Feb. 25, 1896.

Witnesses
J. H. Shumway
Lillian D. Kelsey

Joseph G. Shearlock
Inventor
By Attys
Earle Seymour

UNITED STATES PATENT OFFICE.

JOSEPH G. SHEARLOCK, OF NEW HAVEN, CONNECTICUT, ASSIGNOR TO THE NEW HAVEN HEATING AND PLUMBING COMPANY, OF SAME PLACE.

HOT-WATER HEATER.

SPECIFICATION forming part of Letters Patent No. 555,467, dated February 25, 1896.

Application filed January 14, 1895. Serial No. 534,846. (No model.)

*To all whom it may concern:*

Be it known that I, JOSEPH G. SHEARLOCK, of New Haven, in the county of New Haven and State of Connecticut, have invented a new Improvement in Hot-Water Heaters; and I do hereby declare the following, when taken in connection with the accompanying drawings and the letters of reference marked thereon, to be a full, clear, and exact description of the same, and which said drawings constitute part of this specification, and represent, in—

Figure 1:
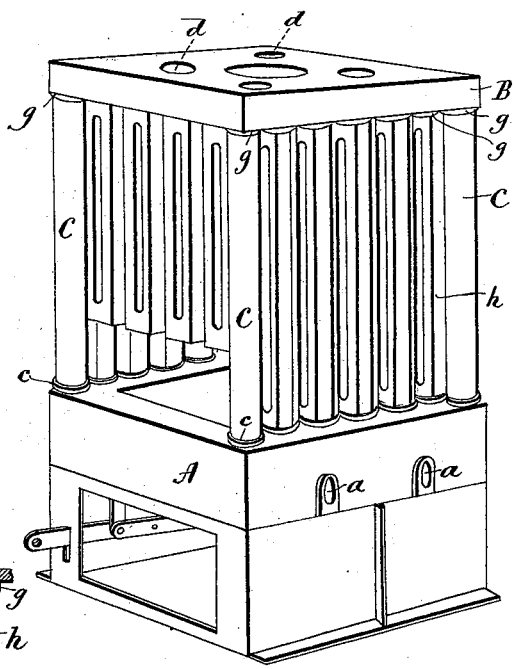
Figure 2:
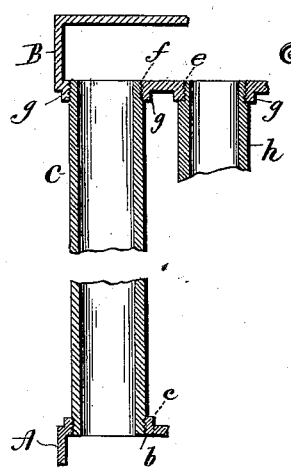

Figure 1, a perspective view of that portion of a heater which embodies my invention; Fig. 2, a sectional view showing one corner of the head and base and the connecting and supporting pipe.

This invention relates to an improvement in heaters, and particularly to such as are applicable for use in hot-water heating—that is, in which a circulation of hot water is the medium by which the heat is carried from the heater to any desired point. In heaters for this purpose it is very necessary that a perfect circulation should be attained. It is also desirable that the joints be perfectly tight and at the same time have the apparatus so simple that it may be readily assembled.

The object of this invention is to so form the head and base that they may be readily connected by tight joints and perfect circulation insured, and it consists in the construction, as will be hereinafter described and particularly recited in the claims.

A represents the base, which is rectangular, so as to surround the fire-pot. On one side the base is formed with openings $a\,a$, more or less in number, to receive the return-pipes. In the upper surface at each corner of the base is an opening $b$ surrounded by a collar $c$. The head B is a chamber, corresponding in size to the size of the base A, and is formed with outlet-openings $d\,d$ in its top and with a series of openings $e\,e$ in its under side, and also with openings $f$ at each corner, corresponding to the openings $b$ in the base. The said openings $e\,f$ are surrounded by collars $g$, formed integral with the several parts, which thicken the metal around the said openings. These openings are screw-threaded, the direction of the threads on the opening $f$ being opposite the direction of the threads on the openings $b$. C C are pipes, threaded at their ends in reverse directions and screwed into the openings in the corners of the head and base, so as to firmly support and secure the head to the base, and through which a circulation between the two may be had, it being understood that the total capacity of the supporting-pipes C must be equal to the capacity of the return-pipes. Into the openings $e$ in the head loops $h\,h$ are screwed, which depend therefrom around and over the fire-pot. The loops I employ are the Bundy loops, patented July 30, 1872, No. 130,013, which are too well known to require further description. By thus constructing the head and base the parts are readily united by the pipes C, the threaded joint between them being amply secure without the addition of other instrumentalities, such as washers or clamping-nuts.

For convenience I have shown and described what is known as a "single" heater, and in which the base and head are connected only at their corners, but in the larger heaters more support will be required for the head and a greater amount of circulation. Consequently more supporting-pipes C will be required and could be placed intermediately between the pipes shown.

Instead of employing the Bundy loops, as shown and described, other forms might be employed without departing from my invention. I therefore do not wish to be understood as limited to any particular form of depending loops which permit a circulation of water in contradistinction to a single pipe.

I claim—

1. In a heater, the combination with a base and a head, of circulating-loops depending from said head, and of pipes supporting said head and connecting it with the base, whereby circulation between said head and base is secured, substantially as described.

2. In a heater the combination with a base and a head, said head provided with depending circulating-loops, said head and base each constructed with threaded openings, surrounded by collars formed integral with the respective parts and increasing the depth of said openings, the threads of the openings in one part of opposite pitch to those in the other part, of pipes threaded at their ends corresponding to the said threaded openings into which they are turned, and whereby the head is supported above the base and a circulation between them is secured, substantially as described.

In testimony whereof I have signed this specification in the presence of two subscribing witnesses.

JOSEPH G. SHEARLOCK.

Witnesses:
FREDERIC C. EARLE,
LILLIAN D. KELSEY.